Patented Mar. 28, 1950

2,501,651

UNITED STATES PATENT OFFICE 2,501,651

METHOD OF PRODUCING ACRYLONITRILE

Joseph F. Martino, Elizabeth, N. J., assignor to American Cyanamid Company, New York, N. Y., a corporation of Maine No Drawing. Application September 1, 1948, Serial No. 47,330

1 Claim. (Cl. 260—465.9)

The present invention relates to the production of acrylonitrile, and more particularly to an improved method for the catalytic production of acrylonitrile from ethylene cyanohydrin.

Acrylonitrile may be obtained by heating ethylene cyanohydrin at a temperature within the range of 160° C.–240° C. in the presence of a sufficient amount of the residue resulting from the heat treatment of the ethylene cyanohydrin. Crude ethylene cyanohydrin usually contains a sufficient quantity of the residue to immediately produce the reaction, whereas a high grade ethylene cyanohydrin requires an initial heating of from 1 to 2 hours in order to form a sufficient quantity of the residue to effect dehydration. Yields of acrylonitrile as high as 82% of theory, based on the ethylene cyanohydrin consumed, have been obtained by this procedure.

It has now been discovered that higher yields of acrylonitrile may be obtained by heating ethylene cyanohydrin in the presence of a catalytic mixture comprising sodium chloride and carbon monoxide.

A preferred method of operation comprises adding to a dehydration vessel, in which a small quantity of ethylene cyanohydrin has been placed, a weight of sodium chloride equivalent to approximately one-fiftieth of the weight of ethylene cyanohydrin to be dehydrated, and bubbling carbon monoxide through the mass in the vessel at a rate of approximately 0.5 cubic foot per pound of ethylene cyanohydrin fed to the vessel. The mixture is maintained at an ethylene cyanohydrin dehydration temperature which is within the range of from about 160° C. to 240° C., and preferably from about 190° C. to 230° C., while the ethylene cyanohydrin is continuously fed to the vessel.

As a result of the heating as above indicated, water is catalytically removed from the ethylene cyanohydrin to form acrylonitrile. The acrylonitrile and water distilled over and can be condensed as a stratifiable distillate from which the acrylonitrile may be recovered. By placing a fractionating column between the mass of catalyst and the take-off for the acrylonitrile-water mixture, unchanged cyanohydrin may be returned to the dehydration zone. The presence of undehydrated cyanohydrin at this point may be minimized by feeding the ethylene cyanohydrin to the dehydration zone only as fast as it can be dehydrated.

The following examples will further illustrate the invention.

Example 1

A solution of 40 grams of sodium chloride dissolved in 150 cc. of water was placed in a dehydration vessel equipped with outlets for feed, stirrer, thermometer, and distillation column, the lower part of said column serving as a fractionating column and thus returning unchanged cyanohydrin to the catalyst. After removing about 125 cc. of water by distillation, 200 grams of ethylene cyanohydrin were added and dehydrated by raising the temperature slowly to 230° C. Carbon monoxide was passed into the charge when the temperature reached 220° C., and the acrylonitrile formed in this initial dehydration run was cleared from the apparatus. 2000 grams of ethylene cyanohydrin (98.7% purity) were then fed to the catalyst at an average rate of 4.5 cc. per minute during a period of approximately 7½ hours. 2.41 cubic feet of carbon monoxide were passed into the catalyst mixture during the run. The average temperature of the mixture in the dehydration vessel was 207° C. A distillate of acrylonitrile and water was collected from the distillation column which separated into two layers, an upper acrylonitrile layer, and a lower water layer. The total quantity of acrylonitrile received during the run represented a 90.1% yield based on the ethylene cyanohydrin consumed.

Example 2

Employing the apparatus and procedure of Example 1, 7313 grams of ethylene cyanohydrin (98% purity) were added to the dehydration vessel during a period of 31 hours at an average rate of 3.8 cc. per minute. 9.77 cubic feet of carbon monoxide and 103 grams of sodium chloride were used. The average feed rate of the carbon monoxide was 0.32 cubic foot per hour, and the temperature of the mixture in the dehydration vessel was maintained within the range of 205° to 210° C. The yield of acrylonitrile was 88.9% of theory.

Various salts such as, for example, monosodium phosphate, disodium phosphate, sodium tetraborate, sodium sulfate, sodium bromide, calcium chloride, and magnesium chloride, when used in place of the sodium chloride in the present process proved ineffective. It was also found that neither the sodium chloride nor the carbon monoxide alone was effective.

The present invention provides a simple and economical method of producing acrylonitrile in high yields.

While the invention has been described with

I claim:

In a method of producing acrylonitrile by heating ethylene cyanohydrin in the presence of a sufficient amount of the residue resulting from the heat treatment of the ethylene cyanohydrin so as to cause dehydration of the ethylene cyanohydrin, the improvement which consists in carrying out the dehydration in the presence of a catalytic mixture comprising sodium chloride and carbon monoxide.

JOSEPH F. MARTINO.

REFERENCES CITED

The following references are of record in the file of this patent:

UNITED STATES PATENTS

| Number | Name | Date |
|---|---|---|
| 2,405,936 | Bartlett | Aug. 20, 1946 |
| 2,452,554 | Davis et al. | Nov. 2, 1948 |